June 1, 1965 S. I. FELDMAN 3,187,097

TELEGRAPH CARRIER ANALYZER

Filed Jan. 11, 1961

INVENTOR.
STANLEY I. FELDMAN

BY S.C. Yuter

ATTORNEY

United States Patent Office 3,187,097 Patented June 1, 1965

3,187,097
TELEGRAPH CARRIER ANALYZER

Stanley I. Feldman, Norwalk County, Conn., assignor to Stelma, Incorporated, Stamford, Conn., a corporation of Connecticut Filed Jan. 11, 1961, Ser. No. 82,088
12 Claims. (Cl. 178—69)

Figures 1, 2:
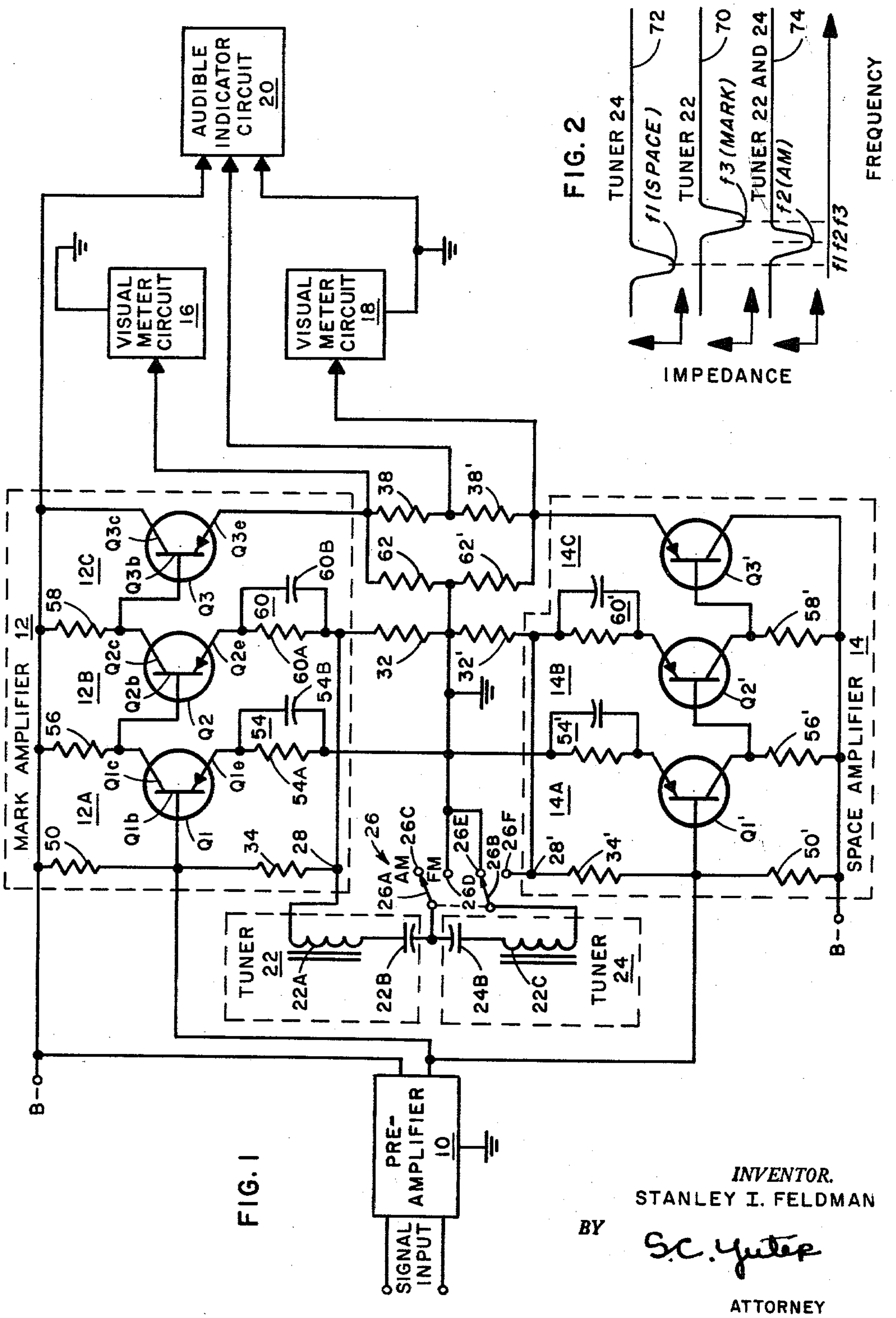

This invention is related to signal analyzers and more particularly to apparatus for analyzing different carrier frequency signals.

In communication systems, such as telegraphy, information is transmitted by modulating a carrier signal. In one such system, called continuous wave keyed signals, the information is contained in an amplitude modulated wave with marks being represented by the presence of the carrier and spaces by the absence of the carrier. In another system, called frequency-shift keying, the information is contained in a frequency modulated carrier with the marks being represented by one frequency and the spaces by another frequency.

Present day telegraph information is usually transmitted over multi-channel communication lines wherein each channel has its own carrier frequency. The carrier signals are separated in frequency from each other by a given number of cycles. For example, a conventional communication line has a frequency response from about one hundred to thirty-one hundred cycles per second. This band width may be divided into eighteen amplitude modulated channels with a carrier separation of one hundred seventy cycles. The same band width may also be divided into seventeen frequency modulated channels. As an example, a particular channel may carry an amplitude modulated carrier (continuous-wave keying) of nine hundred thirty-five cycles or a frequency modulated signal (frequency-shift keying) wherein the marks are represented by signals having frequencies of nine hundred seventy cycles and spaces by signals of nine hundred cycles.

Since it is often necessary to monitor a channel to determine whether it is transmitting information properly it is necessary to employ frequency selective analyzing apparatus. Heretofore, when it was necessary to analyze one such channel, distinct tuning elements were required to select the amplitude modulated signals and the frequency modulated signals. As the number of channels increased, the number of tuned elements became unreasonably large.

It is accordingly a general object of the invention to provide improved signal analyzing equipment.

It is another object of the invention to provide apparatus for analyzing both amplitude modulated signals at a particular carrier frequency or frequency modulated signals having frequencies on either side of the carrier frequency of the amplitude modulated signals.

It is a specific object of the invention to provide telegraph signal analyzing apparatus for detecting the signals representing the marks in an amplitude modulated carrier signal of given frequency or the marks and spaces in a frequency modulated carrier signal which are represented by frequencies on opposite sides of the amplitude modulated carrier frequency.

Briefly, in accordance with one embodiment of the invention, apparatus is provided which includes a first tuning means tuned to a first frequency and a second tuning means tuned to a second frequency. A first amplifier and a second amplifier are provided for amplifying different signals. Switching means couple the tuning means and the amplifiers so that the first amplifier is responsive to signals having the first frequency and the second amplifier is responsive to signals having the second frequency, or the first amplifier is responsive to signals of a third frequency.

More specifically, a first tuner is coupled to a first amplifier and a second tuner is coupled either to the first tuner or to a second amplifier. If the second tuner is coupled to the second amplifier, the first amplifier will amplify signals having a first frequency and the second amplifier will amplify signals having a second frequency. If the second tuner is coupled to the first tuner, the first amplifier will amplify signals having a third frequency.

Other objects, features and advantages of the invention will be apparent from the following detailed description of the invention when read with the accompanying drawing wherein: FIGURE 1 shows signal analyzing apparatus in accordance with the invention; and FIGURE 2 shows waveforms associated with the apparatus of FIGURE 1.

The invention will be described, by way of example, with reference to a telegraph system capable of transmitting marks and spaces on either an amplitude modulated carrier or on a frequency modulated carrier wherein the amplitude modulated carrier has a given frequency and the mark and space frequencies of the frequency modulated transmission, are on either side of the given frequency.

The signal analyzing apparatus of FIGURE 1 comprises a preamplifier 10 which transmits signals to a mark amplifier 12 and a space amplifier 14. The response of the mark amplifier 12 and the space amplifier 14 is controlled by tuners 22 and 24. Mark signals are transmitted from mark amplifier 12 to visual meter circuit 16 and an audible indicator circuit 20. Space signals are transmitted from space amplifier 14 to visual meter circuit 18 and audible indicator circuit 20. Switch 26 couples the tuners 22 and 24 to each other and to the mark and space amplifiers 12 and 14 in particular manners, as is hereinafter described, when amplitude or frequency modulated signals are to be analyzed.

During the analysis of amplitude modulated signals, switch 26 is in the AM (upper) position and tuners 22 and 24 are serially connected to mark amplifier 12 which becomes an amplifier tuned to the carrier frequency of the amplitude modulated signals. Space amplifier 14 is at this time deactivated to any signals. As the mark signals are received from a telegraph loop (not shown), they are preamplified by the preamplifier 10 and transmitted to mark amplifier 12 where they are amplified and transmitted to visual meter circuit 16 and audible indicator circuit 20.

During the analysis of frequency modulated signals, switch 26 is in the FM (lower) position. Tuner 22 is coupled into mark amplifier 12 which becomes an amplifier tuned to the frequency of the mark signals. Tuner 24 is coupled into space amplifier 14 which becomes an amplifier tuned to the frequency of the space signals. Mark signals that are received are transmitted by preamplifier 10 to mark amplifier 12 where they are amplified and transmitted to visual meter circuit 16 and audible indicator circuit 20. Space signals that are received are transmitted by preamplifier 10 to space amplifier 14 where they are amplified and transmitted to visual meter circuit 18 and audible indicator circuit 20.

The elements of the apparatus will now be described in greater detail.

Mark amplifier 12 is a direct-coupled amplifier comprising common emitter amplifier 12A, feedback amplifier 12B, and emitter follower amplifier 12C connected in that order. Common emitter amplifier 12A includes a transistor Q1 having: a base, Q1*b*, coupled via bias resistor 50 to a source of potential B—, to the output of preamplifier 10, and via resistor 34 to junction 28; an emitter Q1*e* coupled via biasing network 54 (resistor 54A and capacitor 54B in parallel) to ground potential; and a collector Q1*c* coupled via resistor 56 to source of potential B—. Feedback amplifier 12B includes transistor Q2 having: a base Q2*b* directly coupled to the collector Q1*c* of transistor Q1; a collector Q2*c* coupled via resistor 58 to source of potential B—; and an emitter Q2*e* coupled via biasing network 60 and feedback resistor 32, in series, to ground or reference potential source. The junction of feedback resistor 32 and biasing network 60 (resistor 60A and capacitor 60B in parallel) is connected to junction 28. Emitter follower amplifier 12C includes a transistor Q3 having: a base Q3*b* directly coupled to the collector Q2*c* of transistor Q2; a collector Q3*c* coupled to source of potential B—; and an emitter Q3*e*, coupled to visual meter circuit 16 and, via resistor 38, to audible indicator circuit 20. The end of resistor 38 remote from audible indicator circuit 20 is coupled via resistor 62 to ground potential.

Space amplifier 14 is similar to mark amplifier 14 and therefore will not be described in detail, however, corresponding elements in space amplifier 14 are indicated by the same but primed reference characters.

Tuner 22 comprises a series resonant circuit that includes inductor 22A and capacitor 22B which are tuned to the frequency of the mark signals during frequency modulated signalling. The remaining terminal of inductor 22A is coupled to junction 28. The remaining terminal of capacitor 22B is coupled to moving contact 26A of switch 26.

Tuner 24 comprises a series resonant circuit that includes inductor 24A and capacitor 24B which is tuned to the frequency of the space signals during frequency modulated signalling. The remaining terminal of inductor 24A is coupled to the moving contact 26B of switch 26. The remaining terminal of capacitor 24B is coupled to the moving contact 26A of switch 26.

Switch 26 is a double-pole double-throw switch having: a first pair of fixed contacts 26C and 26D associated with moving contact 26A with electrically isolated and fixed contact 26D coupled to ground potential; and a second pair of fixed contacts 26E and 26F associated with moving contact 26B, with fixed contact 26E coupled to ground potential and fixed contact 26F, coupled to junction 28'.

When switch 26 is in the AM or upper position, tuners 22 and 24 form a series resonant circuit tuned to the amplitude modulated carrier frequency and in parallel with feedback resistor 32. When switch 26 is in the FM or lower, position, tuner 22 is in parallel with feedback resistor 32 and tuner 24 is in parallel with feedback resistor 32'.

The operation of mark amplifier 12 will now be described in detail with switch 26 in the FM position. As signals are received by preamplifier 10 they are amplified by common emitter amplifier 12A and fed to feedback amplifier 12B which develops a signal across feedback resistor 32 that is one hundred eighty degrees out of phase with the signal received at the base Q1*b* of transistor Q1. If the signal being received is different from the resonant frequency of the tuner 22, i.e., the mark frequency, a large feedback signal is applied via resistor 34 to the base Q1*b* of transistor Q1 where it tends to cancel the input signal. Mark amplifier 12 therefore transmits no signals to visual meter circuit 16 and audible indicator circuit 20. When, however, frequency modulated mark signals are being received, the tuner 22 presents a low impedance and the feedback signal is attenuated to a large degree because of the low impedance to ground. There is a minimum of cancellation at the base Q1*b* of transistor Q1 and mark amplifier 12 does transmit mark signals.

The frequency response of tuner 22 is shown as curve 70 of FIGURE 2 which is a plot of impedance as a function of frequency. It is seen that at frequency *f3*, the mark signal frequency, the impedance is a minimum. At all other frequencies, and particularly the space signal frequency *f1* and the frequency of the amplitude modulated carrier *f3*, the impedance of tuner 22 is high.

Space amplifier 14 operates in a similar manner only during frequency modulated signalling. However, as is shown by curve 72 of FIGURE 2 the impedance of tuner 24 is low at frequency *f1*, the space signal frequency.

The operation of mark amplifier 12 will now be described in detail with switch 26 in the AM position. As signals are received by preamplifier 10, they are amplified by common emitter amplifier 12A and fed to feedback amplifier 12B which develops a signal across feedback resistor 32 that is one hundred eighty degrees out of phase with the signal received at the base Q1*b* of transistor Q1. If the signal being received is different from the resonant frequency *f2* of the series connected tuners 22 and 24, i.e., the amplitude modulated carrier frequency, a large feedback signal is applied via resistor 34 to the base Q1*b* of transistor Q1 where it tends to cancel the input signal. Mark amplifier 12 therefore, transmits no signals to visual meter circuit 16 and audible indicator circuit 20. If, however, an amplitude modulated carrier is being received having a frequency which is the same as the resonant frequency *f2* of the series connected tuners 22 and 21, the series connected tuners 22 and 24 are at a low impedance and the feedback signal is attenuated to a large degree because of the low impedance to ground. There is a minimum of signal cancellation at the base Q1*b* of transistor Q1 and mark amplifier 12 does transmit mark signals.

The frequency response of the serially connected tuners 22 and 24 is shown in FIGURE 2 as curve 74. It is there shown that the resonant frequency is frequency *f2* which is substantially midway between the frequencies *f1* and *f3*. Thus, at frequency *f2*, the amplitude modulated carrier frequency, serially connected tuners 22 and 24 have a very low impedance, while, at all other frequencies the impedance is high.

In a typical application, the mark signal frequency may be nine hundred and seventy cycles, the space signal frequency nine hundred cycles, and the amplitude modulated carrier nine hundred thirty five cycles. Accordingly tuner 22 has series resonant frequency *f3* of nine hundred seventy cycles, tuner 24 has a series resonant frequency of nine hundred cycles and when tuners 22 and 24 are serially connected, the resulting circuit has a series resonant frequency *f2* of nine hundred thirty five cycles.

Preamplifier 10 can be a conventional amplifier of suitable bandwith to pass and amplify signals at the required frequencies. Visual meter circuits 16 and 18 may be conventional circuit arrangements which may include a halfwave rectifier, a filter and a current meter serially connected in that order. Audible indicator circuit 20 may be a conventional audio amplifier which drives a speaker.

The following are representative value of the circuit elements which may be readily ascertained by those skilled in the art and are given only by way of example:

| | | |
|---|---|---|
| Inductor 22A | henrys | 1.25 |
| Inductor 24A | do | 1.25 |
| Capacitor 22B | | (1) |
| Capacitor 24B | | (1) |
| Resistor 34 | ohms | 5600 |
| Resistor 32 | do | 3300 |
| Resistor 50 | do | 18000 |
| Resistor 38 | do | 51000 |
| Resistor 56 | do | 12000 |
| Resistor 54A | do | 5600 |
| Resistor 58 | do | 15000 |
| Resistor 60A | do | 10000 |
| Resistor 62 | do | 10000 |
| Resistor 62' | do | 10000 |
| Capacitor 54B | microfarads | 22 |
| Capacitor 60B | do | 22 |
| Transistor *q*1 | | ST 114 |
| Transistor *q*1 | | ST 114 |
| Transistor *q*1 | | ST 114 |

[1] Selected to provide series resonance at the desired channel frequency.

There has thus been shown improved signal analyzer apparatus which by employing tuners which when used independently select frequency modulated signals and when used serially selects amplitude modulated signals to provide a simple and inexpensive system.

This application is a continuation-in-part of the copending application of Stanley I. Feldman, Serial No. 857,461, filed December 4, 1959, for Telegraph Carrier Analyzer, now abandoned.

There will now be obvious to those skilled in the art many modifications and variations satisfying many or all of the objects of the invention, and to which accrue the advantages of the invention but which do not depart from the spirit of the invention as defined in the appended claims.

What is claimed is:

1. Telegraph test means comprising input means for receiving both amplitude and frequency modulated signals, first and second detector means for recognizing the presence of signals of predetermined frequencies, switch means connected between said input means and said first and second detector means and having control means movable between a first and a second position; said first and second detector means being responsive to first and second predetermined frequencies respectively when said control means is in said first position, and one of said detector means being responsive to a third predetermined frequency which is a function of said first and second frequencies when said switch means is in said second position.

2. Telegraph test means comprising input means for receiving both amplitude and frequency modulated signals, first and second detector means for recognizing the presence of signals of predetermined frequencies, switch means connected between said input means and said first and second detector means and having control means movable between a first and a second position; said first and second detector means being responsive to first and second predetermined frequencies respectively when said control means is in said first position, and one of said detector means being responsive to a third predetermined frequency which is a function of said first and second frequencies when said switch means is in said second position, said third frequency being intermediate said first and second frequencies.

3. A telegraph test set comprising input means, a tuner, first and second amplifiers each having plural outputs, said tuner selectively producing maximum current-conduction conditions in said amplifiers for individual carrier channel signals, feedback means connecting a first output of each of said amplifiers to said tuner, said first amplifier producing gain in frequency-modulated and amplitude-modulated marking signals at a second output, said second amplifier producing gain in frequency modulated spacing signals at a second output, said gains being fed respectively to marking and spacing signal indicators.

4. A telegraph carrier analyser comprising tuned input means for receiving signals containing communication channel information, input signal distributing means connected to said tuned input means, current-sensitive telegraph keying indicator means, feedback means, an amplifier fed by distributing means, said amplifier having plural outputs, a first output of said amplifier being connected by said feedback means to said distributing means and selectively a second output of said amplifier actuating said indicators respectively in accordance with FM spacing and AM and FM marking operation of individual channels.

5. A telegraph carrier analyzer for analyzing keyed and steady-state marking and spacing operation of a plurality of individual frequency-shift and amplitude-modulated telegraph carrier channels, comprising input means, a tuner connected to said input means, substantially non-reactive first and second amplifiers, and first and second indicating means, a portion of the outputs of said amplifiers fed to said tuner, said tuner being selectively producing substantially non-reactive current-conduction conditions in said amplifiers for signals communicated in individual channels of said plurality of channels, said first amplifier controlling detection of amplitude-modulated and marking frequency-shift carrier pulses by means of said first indicating means, and said second amplifier controlling detection of spacing frequency-shift carrier pulses by means of said second indicating means.

6. A telegraph test for selectively analyzing modes of operation of a plurality of carrier channels capable of being contained in a signal input, comprising two telegraph keying indicator means, tuner means, an amplifier, and an input device connected electrically to said tuner and amplifier respectively, a first part of the output of said amplifier being connected back to said tuning means, said tuning means comprising means adapted to select an individual carrier channel from said plurality, a second part of the output of said amplifier being connected respectively to said indicator means, and switching means connecting said input device to said amplifier, one of said indicating means being actuated by keyed frequency-modulation spacing operation of said individual carrier channel and the other of said indicating means being actuated by amplitude-modulation and frequency-modulation marking operation of said individual carrier channel.

7. A telegraph test set comprising input means for receiving input signals, first and second tuning means connected to said input means, substantially direct-coupled first and second amplifier means, marking and spacing signal indicating means, and feedback means connecting the outputs of said amplifiers to said tuning means and indicating means, said first tuning means being selectively connected to said spacing signal indicating means and first amplifier means input to indicate the presence of frequency-modulated spacing pulses in said signal input, said second tuning means being selectively connected to said second amplifier input and marking signal indicating means to indicate the presence of marking pulses in said input signal, and said marking signal indicating means and said second amplifier being selectively connected to both said tuning means to provide energy for indication of presence of amplitude-modulated marking pulses in said signal input.

8. A telegraph carrier analyser comprising first and second tuning means, input means for receiving input signals containing communication channel intelligence, first and second current-sensitive keying indicator means, and plural amplifier means connected respectively to said tuning and input means, said first tuning means selectively actuating said first indicator means to indicate the presence of frequency-modulation spacing pulses in individual channels comprised in said input signals, said second tuning means selectively actuating said second indicator means to indicate the presence of frequency-modulation marking pulses in individual channels comprised in said input signals, and both said first and second tuning means together selectively actuating said second indicator means to indicate the presence of amplitude-modulation pulses in individual channels comprised in said input signals.

9. A telegraph carrier analyzer for analyzing keyed and steady-state marking and spacing operation of a plurality of individul frequency-shift and amplitude modulated telegraph carrier channels, comprising input means, first and second tuner means connected to said input means, substantially nonreactive first and second amplifiers, and first and second indicating means, a portion of the outputs of said amplifiers being fed respectively to said tuner means, said first tuner means being adapted to selectively control detection of frequency-shift spacing pulses by said first amplifier and first indicating means, said second tuner means being adapted to selectively control detection of frequency-shift marking pulses by said second amplifier and second indicating means, said first and second tuner means also being adapted to selectively control detection of amplitude-modulated pulses by said second amplifier and second indicating means.

10. A signal amplifier comprising a first signal amplifying means having an output terminal and an input terminal, first feedback means for feeding back from the output terminal to the input terminal of said first signal amplifying means signals for cancelling received signals, a first resonant circuit having a resonant frequency *f1* coupled to said feedback means for preventing the feeding back of signals to the input terminal of said first signal amplifying means when the received signals have a resonant frequency *f1*, a second signal amplifying means having an output terminal and an input terminal, second feedback means for feeding back from the output terminal to the input terminal of said second signal amplifying means signals for cancelling received signals, a second resonant circuit having a resonant frequency *f3* coupled to said second feedback means for preventing the feeding back of signals to the input terminal of said second signal amplifying means when the received signals have a frequency *f3*, and switching means for connecting said second resonant circuit to said first resonant circuit to form a third resonant circuit having a resonant frequency *f2* for preventing the feeding back of signals from the output terminal to the input terminal of said first signal amplifying means when the received signals have a frequency *f2*.

11. A signal amplifier comprising a first signal amplifying means having an output terminal and an input terminal, first feedback means for feeding back from the output terminal to the input terminal of said first signal amplifying means signals for cancelling received signals, a first resonant circuit having a resonant frequency *f1* for coupling said first feedback means to ground for preventing the feeding back of signals to the input terminal of said first signal amplifying means when the received signals have a resonant frequency *f1*, a second signal amplifying means having an output terminal and an input terminal, second feedback means for feeding back from the output terminal to the input terminal of said second signal amplifying means signals for cancelling received signals, a second resonant circuit having a resonant frequency *f3* for coupling said second feedback means to a reference potential source for preventing the feeding back of signals when the received signals have a frequency *f3* and switching means for serially connecting said second resonant circuit to said first resonant circuit to form a third resonant circuit having a resonant frequency *f2* which couples said first feedback means to a reference potential source for preventing the feeding back of signals from the output terminal to the input terminal of said first signal amplifying means when the received signals have a frequency *f2*.

12. A signal amplifier comprising a first signal amplifying means having an input terminal and an output terminal, first feedback means for feeding back from the output terminal to the input terminal of said first signal amplifying means signals for cancelling received signals, a first series resonant circuit having a resonant frequency *f1* for coupling said first feedback means to ground for preventing the feeding back of signals to the input terminal of said first signal amplifying means when the received signals have a frequency *f1*, a second signal amplifying means having an output terminal and an input terminal, second feedback means for feeding back from the output terminal to the input terminal of said second signal amplifying means signals for cancelling received signals, a second series resonant circuit having a frequency *f3* for coupling said second feedback means to ground potential for preventing the feeding back of signals when the received signals have a frequency *f3*, and switching means for serially connecting said second series resonant circuit to said first series resonant circuit to form a third series resonant circuit having a resonant frequency *f2* which couples said first feedback means to ground potential for preventing the feeding back of signals from the output terminal to the input terminal of said first signal amplifying means when the received signals have a frequency *f2*.

References Cited by the Examiner

UNITED STATES PATENTS

| | | | |
|---|---|---|---|
| 2,193,825 | 3/40 | Lowell | 178—88 |
| 2,652,451 | 9/53 | Feten | 178—88 |
| 2,654,025 | 9/53 | Higgens | 178—88 |

ROBERT H. ROSE, *Primary Examiner.*

NEWTON N. LOVEWELL, WALTER L. LYNDE, *Examiners.*